(12) United States Patent
Wu

(10) Patent No.: US 8,202,607 B2
(45) Date of Patent: *Jun. 19, 2012

(54) NANO DIAMOND CONTAINING INTERMEDIATE TRANSFER MEMBERS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 686 days.

This patent is subject to a terminal disclaimer.

(21) Appl. No.: 12/360,324

(22) Filed: Jan. 27, 2009

(65) Prior Publication Data

US 2010/0190007 A1 Jul. 29, 2010

(51) Int. Cl.
*B32B 3/00* (2006.01)
*B32B 5/16* (2006.01)
*B32B 7/00* (2006.01)

(52) U.S. Cl. ........ 428/206; 428/208; 428/212; 428/220; 428/323; 428/332; 428/412; 428/473.5; 428/698; 428/702; 428/704

(58) Field of Classification Search .................. 428/206, 428/208, 212, 220, 323, 332, 412, 473.5, 428/698, 702, 704
See application file for complete search history.

(56) References Cited

U.S. PATENT DOCUMENTS

| | | | |
|---|---|---|---|
| 5,487,707 A | | 1/1996 | Sharf et al. |
| 5,701,568 A | * | 12/1997 | Hiroshima et al. ........... 399/302 |
| 6,318,223 B1 | | 11/2001 | Yu et al. |
| 6,397,034 B1 | | 5/2002 | Tarnawskyj et al. |
| 6,440,515 B1 | | 8/2002 | Thornton et al. |
| 6,602,156 B2 | | 8/2003 | Schlueter, Jr. |
| 7,031,647 B2 | * | 4/2006 | Mishra et al. .................. 399/302 |
| 7,130,569 B2 | | 10/2006 | Goodman et al. |
| 7,139,519 B2 | * | 11/2006 | Darcy et al. .................... 399/302 |
| 8,057,973 B2 | | 11/2011 | Wu |
| 2005/0158549 A1 | * | 7/2005 | Khabashesku et al. ....... 428/403 |
| 2007/0212126 A1 | * | 9/2007 | Seto et al. ..................... 399/302 |
| 2008/0124130 A1 | | 5/2008 | Watanabe et al. |
| 2008/0152405 A1 | | 6/2008 | Kuntz et al. |
| 2010/0028064 A1 | * | 2/2010 | Shiozawa ...................... 399/341 |
| 2010/0190008 A1 | | 7/2010 | Wu |
| 2010/0190956 A1 | | 7/2010 | Wu |

FOREIGN PATENT DOCUMENTS

WO    WO 2007/148667 A1 * 12/2007

OTHER PUBLICATIONS

Zhang et al, "Grafting Polyimides from Nanodiamonds", Macromolecules American Chemical Society, Feb. 12, 2008, vol. 41, No. 3, pp. 536-538, United States.

Shenderova et al, "Nanodiamond and Onion-like Carbon Polymer Nanocomposites", Diamond and Related Materials, Apr. 13, 2007, vol. 16, No. 4-7, pp. 1213-1217, Elsevier Science Publishers, Amsterdam, NL.

Hawelek et al, "Structural Studies of Nanodiamond by High-energy X-ray Diffraction", Diamond and Related Materials, Jul. 1, 2008, vol. 17, No. 7-10, pp. 1186-1193, Elsevier Science Publishers, Amsterdam, NL.

Osswald et al, "Control of sp<2>/sp<3> Carbon Ratio and Surface Chemistry of Nanodiamond Powders by Selective Oxidation in Air", Journal of the American Chemical Society, Sep. 6, 2006, vol. 128, No. 35, pp. 11635-11642, United States.

* cited by examiner

*Primary Examiner* — Betelhem Shewareged
(74) *Attorney, Agent, or Firm* — Eugene O. Palazzo

(57) ABSTRACT

An intermediate transfer media, such as a belt, that includes a nano diamond.

27 Claims, No Drawings

NANO DIAMOND CONTAINING INTERMEDIATE TRANSFER MEMBERS

CROSS REFERENCE TO RELATED APPLICATIONS

Copending U.S. application Ser. No. 12/360,307, U.S. Publication No. 20100190008 on Polypyrrole Containing Intermediate Transfer Components, filed Jan. 27, 2009, the disclosure of which is totally incorporated herein by reference, illustrates an intermediate transfer member comprised of a substrate comprising a carbon black which is surface treated with a polypyrrole.

Copending U.S. application Ser. No. 12/360,190, U.S. Patent Publication No. 20100190956, on Polyaniline Viologen Charge Transfer Complexes Containing Intermediate Transfer Members, filed Jan. 27, 2009, the disclosure of which is totally incorporated herein by reference, illustrates an intermediate transfer member comprised of a substrate and a polyaniline viologen charge transfer complex.

U.S. application Ser. No. 12/360,335, now U.S. Pat. No. 8,057,973 on Nano Diamond Anticurl Backside Coating (ACBC) Photoconductors, filed Jan. 27, 2009, the disclosure of which is totally incorporated herein by reference, illustrates a photoconductor comprising a first layer, a supporting substrate thereover, a photogenerating layer, and at least one charge transport layer comprised of at least one charge transport component, and wherein the first layer is in contact with the supporting substrate on the reverse side thereof, and which first layer is comprised of a nano diamond component.

Illustrated in U.S. application Ser. No. 12/200,111, U.S. Publication No. 20100055445, filed Aug. 28, 2008, entitled Hydrophobic Polyetherimide/Polysiloxane Copolymer Intermediate Transfer Components, the disclosure of which is totally incorporated herein by reference, is an intermediate transfer member comprised of a substrate comprising a polyetherimide polysiloxane copolymer.

Illustrated in U.S. application Ser. No. 12/200,147, U.S. Publication No. 20100055328, filed Aug. 28, 2008, entitled Coated Seamed Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,074, U.S. Publication No. 20100055463, filed Aug. 28, 2008, entitled Hydrophobic Carbon Black Intermediate Transfer Components, the disclosure of which is totally incorporated herein by reference, is an intermediate transfer member comprised of a substrate comprising a carbon black surface treated with a poly(fluoroalkyl acrylate).

Illustrated in U.S. application Ser. No. 12/200,179, U.S. Publication No. 20100051171, filed Aug. 28, 2008, entitled Coated Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 12/129,995, now U.S. Pat. No. 8,005,410 filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of from about 175° C. to about 290° C. over a period of time of from about 10 minutes to about 120 minutes.

Illustrated in U.S. application Ser. No. 12/181,354, now U.S. Pat. No. 7,985,464 filed Jul. 29, 2008, entitled Core Shell Intermediate Transfer Components, the disclosure of which is totally incorporated herein by reference, is an intermediate transfer belt comprised of a substrate comprising a conductive core shell component.

Illustrated in U.S. application Ser. No. 12/181,409, now U.S. Pat. No. 7,738,824 filed Jul. 29, 2008, entitled Treated Carbon Black Intermediate Transfer Components, the disclosure of which is totally incorporated herein by reference, is an intermediate transfer members comprised of a substrate comprising a poly(vinylalkoxysilane) surface treated carbon black.

BACKGROUND

Disclosed are intermediate transfer members, and more specifically, intermediate transfer members useful in transferring a developed image in an electrostatographic, for example xerographic, including digital, image on image, and the like, machines or apparatuses, and printers. In embodiments, there are selected intermediate transfer members comprised of a nano diamond, which is commercially available, comprised, for example, of a core shell structure with an inert diamond core and a conductive graphite shell. In embodiments thereof, the nano diamond is dispersed in or mixed with a suitable polymer, such as a polyimide or a polycarbonate.

A number of advantages are associated with the intermediate transfer members, such as belts (ITB) of the present disclosure, such as the use of nano diamond which can be readily dispersed in both water and organic solvents primarily in view of the spectrum of functional chemical groups like carbon, oxygen, and nitrogen with directly linked carbon structures on the surface, and where the surface can be readily modified; an excellent maintained conductivity for extended time periods; dimensional stability; ITB humidity insensitivity for extended time periods; excellent dispersibility in a polymeric solution; wear and abrasion resistance; and low and acceptable surface friction characteristics.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant. Generally, the electrostatic latent image is developed by contacting it with a developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members may possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member which ultimately can lead to less than complete toner transfer, resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034 which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide an intermediate transfer member, which has excellent transfer capabilities; is conductive, and more specifically, has improved conductivity or resistivity as compared, for example, to an intermediate transfer member where nano diamond is absent; and possesses excellent humidity insensitivity characteristics leading to high copy quality where developed images with minimal resolution issues can be obtained. It is also desired to provide a weldable intermediate transfer belt that may not, but could, have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps. It is also desired to provide an intermediate transfer member, which has excellent wear and abrasion resistance, and more specifically, has improved mechanical properties as compared, for example, to an intermediate transfer member where nano diamond is absent.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt comprising a belt substrate comprising primarily at least one polyimide polymer, and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is usually labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

In embodiments, there is disclosed an intermediate transfer member comprised of a substrate comprising a nano diamond; an intermediate transfer member, such as an intermediate belt comprised of a substrate comprising a nano diamond; an intermediate transfer member wherein the resistivity thereof is from about $10^6$ to about $10^{13}$ ohm/square, from about $10^8$ to about $10^{12}$ ohm/square, and more specifically, from about $10^9$ to about $10^{11}$ ohm/square.

In embodiments, there is disclosed an intermediate transfer member comprised of a substrate comprising nano diamonds with an excellent maintained resistivity for extended time periods. More specifically, there is almost no change in the intermediate transfer member surface resistivity with, for example, an intermediate transfer member comprised of a substrate comprising a nano diamond.

In embodiments, there is disclosed an intermediate transfer member comprised of a substrate comprising nano diamonds, and which member possesses excellent wear and abrasion resistance.

In embodiments, there is disclosed an intermediate transfer member comprised of a substrate comprising nano diamonds, and which member has a low friction coefficient, thereby permitting a desirable slippery surface.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image and to form a developed image on the charge retentive surface; a weldable intermediate transfer belt to transfer the developed image from the charge retentive surface to a substrate, and a fixing component.

DETAILED DESCRIPTION

Aspects of the present disclosure relate to an intermediate transfer member comprised of a nano diamond; a transfer media comprised of a nano diamond, and wherein the nano diamond is comprised of a diamond core and a graphite shell; and an apparatus for forming images on a recording medium comprising a charge retentive surface to receive an electrostatic latent image thereon; a development component to apply toner to the charge retentive surface to develop the electrostatic latent image, and to form a developed image on the charge retentive surface; and an intermediate transfer member comprised of a substrate comprising a nano diamond or a mixture of nano diamonds.

Nano diamonds, which are available from, for example NANOBLOX, Inc., comprise, for example, a core-shell structure with a hard and inert diamond core and a conductive graphite shell, where the graphite shell surface includes a spectrum of functional chemical groups like carbon, about 76 percent; oxygen, about 6 percent; and nitrogen, about 10 percent, directly linking to the graphite carbon, thereby rendering the nano diamond conductive. More specifically, nano diamond can be prepared by the detonation of a diamond blend of synthetic and/or natural diamond, and subsequently, by chemical purification with the diameter of diamond crystals being, for example, from about 1 to about 10 nanometers, and specifically, with an average diameter of about 5 nanometers; a B.E.T. surface area that is no less than about 270 to about 380 square meters per gram, with an average grain size of from about 20 to about 50 nanometers; and with a unique rounded shape that provides excellent lubricity characteristics with the hardness and wear resistance of diamond.

Nano diamonds are commercially available from NANOBLOX, Inc. in either a powder or a dispersion form. For example, commercially available nano diamond black (NB50) possesses 50 percent of $sp^3$ carbon and 50 percent of $sp^2$ carbon ($sp^3$ diamond core and $sp^2$ graphite envelop, B.E.T. surface area about 460 $m^2$/g); nano diamond (NB90) possesses 90 percent of $sp^3$ carbon and 10 percent of $sp^2$ carbon ($sp^3$ diamond core and $sp^2$ graphite envelop, B.E.T. surface area about 460 $m^2$/g); and nano diamond (NB98) possesses 98 percent of $sp^3$ carbon and 2 percent of $sp^2$ carbon ($sp^3$ diamond core and $sp^2$ graphite envelop). Surface modified nano diamonds are also available from NANOBLOX, Inc., including being modified with —OH, —COOH, —NH$_2$ or a quaternerized amine, and —CH$_3$, with the corresponding nano diamonds being referred to as NB90-OH, NB90-COOH, NB90-NH$_2$ or a NB90-quaternerized amine, and NB90-CH$_3$. Metal modified nano diamonds are also available from NANOBLOX, Inc., including being modified with Cu, Fe, Ag, Au, and Al, and the corresponding nano diamonds are referred to as NB90-Cu, NB90-Fe, NB90-Ag, NB90-Au, and NB90-Al. These nano diamonds are readily dispersed in either aqueous or solvent dispersions.

In contrast, a carbon black surface is composed of graphitic planes with some oxygen and hydrogen at the edges while the nano diamond surface in embodiments is composed of graphitic planes with a spectrum of functional chemical groups (C about 76 percent, O about 6 percent, and N about 10 percent) with directly linked carbon structures, thus nano diamond is more readily dispersed than carbon black. In addition, the nano diamond should also, it is believed, impart improved mechanical properties to an intermediate transfer member (ITB) due to its hard diamond core.

The core-shell nano diamond comprises a diamond core, present in an amount of from, for example, about 40 to about 99.9, from about 50 to about 98, or from about 70 to about 95 weight percent. The core-shell nano diamond further comprises a conductive shell comprised, for example, of graphite and a modified graphite, such as being modified with —OH, —COOH, —NH$_2$, or a quaternerized amine, —CH$_3$, C$_2$H$_5$, Cu, Fe, Ag, Au, and Al, present in an amount of, for example, from about 0.1 to about 60, from about 2 to about 50, or from about 5 to about 30 weight percent.

Nano diamond is present in an amount of from about 3 to about 30, from about 1 to about 30, from about 5 to about 20, or from about 10 to about 15 weight percent based on the intermediate transfer member.

Examples of additional components present in the intermediate transfer member are a number of known polymers and conductive components.

Examples of the polymeric binders selected to disperse the nano diamond include, for example, polyimides (thermosetting or thermoplastic), polycarbonate, poly(ethylene terephthalate) (PET), poly(ethylene naphthalate) (PEN), poly(butylene terephthalate) (PBT), polyvinylidene fluoride (PVDF), and polyethylene-co-polytetrafluoroethylene.

Examples of rapidly cured polyimide polymers selected in the binder are, for example, VTEC™ PI 1388, 080-051, 851, 302, 203, 201 and PETI-5, all available from Richard Blaine International, Incorporated, Reading, Pa. These thermosetting polyimides are cured at suitable temperatures, and more specifically, from about 180° C. to about 260° C. over a short period of time, such as, for example, from about 10 to about 120 minutes, and from about 20 to about 60 minutes; possess, for example, a number average molecular weight of from about 5,000 to about 500,000, or from about 10,000 to about 100,000, and a weight average molecular weight of from about 50,000 to about 5,000,000, or from about 100,000 to about 1,000,000. Also, there can be selected as the binder thermosetting polyimide precursors that are usually cured at higher temperatures (above 300° C.) than the VTEC™ PI polyimide precursors, and which higher temperature cured precursors include, for example, PYRE-M.L® RC-5019, RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, commercially available from E.I. DuPont, Wilmington, Del.; and present, for example, in amounts of, for example, of from about 70 to about 97, or from about 80 to about 95 weight percent of the intermediate transfer member components.

Examples of specific selected thermoplastic polyimide binders are KAPTON® KJ, commercially available from E.I. DuPont, Wilmington, Del., as represented by

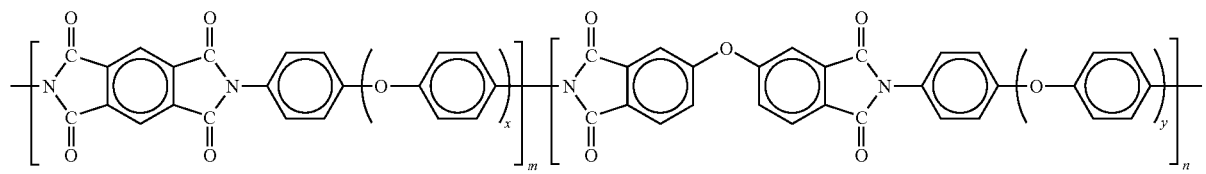

wherein x is equal to 2; y is equal to 2; m and n are from about 10 to about 300; and IMIDEX®, commercially available from West Lake Plastic Company, as represented by

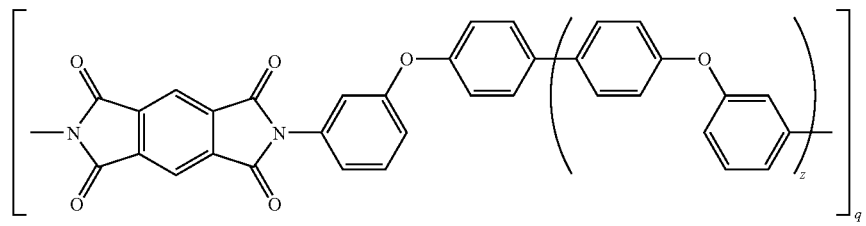

wherein z is equal to 1, and q is from about 10 to about 300.

Examples of polycarbonate binders selected include poly (4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the intermediate transfer member binders are comprised of bisphenol-A-polycarbonate resins, commercially available as MAKROLON®, with, for example, a weight average molecular weight of from about 50,000 to about 500,000.

Examples of additional components present in the intermediate transfer member are a number of known conductive components present in an amount of from about 3 to about 20 weight percent such as a first and a second polyaniline, and carbon black. In embodiments, the polyaniline component has a relatively small particle size of, for example, from about 0.5 to about 5, from about 1.1 to about 2.3, from about 1.2 to about 2, from about 1.5 to about 1.9, or about 1.7 microns.

Specific examples of polyanilines selected for the transfer member, such as an ITB, are PANIPOL™ F, commercially available from Panipol Oy, Finland; and lignosulfonic acid grafted polyanilines.

Examples of the intermediate transfer member carbon black include VULCAN® carbon blacks, REGAL® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=105 ml/g), BLACK PEARLS® 880 (B.E.T. surface area=240 m$^2$/g, DBP absorption=106 ml/g), BLACK PEARLS® 800 (B.E.T. surface area=230 m$^2$/g, DBP absorption=68 ml/g), BLACK PEARLS® L (B.E.T. surface area=138 m$^2$/g, DBP absorption=61 ml/g), BLACK PEARLS® 570 (B.E.T. surface area=110 m$^2$/g, DBP absorption=114 ml/g), BLACK PEARLS® 170 (B.E.T. surface area=35 m$^2$/g, DBP absorption=122 ml/g), VULCAN® XC72 (B.E.T. surface area=254 m$^2$/g, DBP absorption=176 ml/g), VULCAN® XC72R (fluffy form of VULCAN® XC72), VULCAN® XC605, VULCAN® XC305, REGAL® 660 (B.E.T. surface area=112 m$^2$/g, DBP absorption=59 ml/g), REGAL® 400 (B.E.T. surface area=96 m$^2$/g, DBP absorption=69 ml/g), and REGAL® 330 (B.E.T. surface area=94 m$^2$/g, DBP absorption=71 ml/g). Dibutyl phthalate (DBP) absorption by the voids within carbon blacks are used to measure the structure of carbon black. The higher the structure, the more the voids, and the higher the DBP absorption.

For example, the nano diamond can be dispersed in a rapid curing thermosetting polyimide/N-methyl-2-pyrrolidone (NMP) solution, and then the dispersion can be applied to or coated on a glass plate using known draw bar coating methods. The resulting film or films can be dried at high temperatures, such as from about 100° C. to about 400° C., from about 150° C. to about 300° C., or from about 175° C. to about 200° C. for a sufficient period of time, such as for example, from about 20 to about 180, or from about 75 to about 100 minutes while remaining on the glass plate. After drying and cooling to room temperature, the film or films on the glass plate or separate glass plates are immersed into water overnight, about 18 to 23 hours, and subsequently, the about 50 to about 150 microns thick film of films formed are released from the glass resulting in the functional intermediate transfer member or members as disclosed herein.

In embodiments, the nano diamond can be dispersed in a bisphenol-A-polycarbonate/methylene chloride (CH$_2$Cl$_2$) solution, and then the dispersion can be applied to or coated on a biaxially oriented poly(ethylene naphthalate) (PEN) substrate (KALEDEX™ 2000) having a known thickness of, for example, about 3.5 mils using known draw bar coating methods. The resulting film or films can be dried at high temperatures, such as from about 100° C. to about 200° C., or from about 120° C. to about 160° C. for a sufficient period of time, such as for example, from about 1 to about 30, or from about 5 to about 15 minutes while remaining on the PEN substrate. After drying and cooling to room temperature, about 23° C. to about 25° C., the film or films on the PEN substrate or separate PEN substrates are automatically released from the substrate resulting in the functional intermediate transfer member or members as disclosed herein.

The disclosed intermediate transfer members are, in embodiments, weldable, that is the seam of the member, like a belt, is weldable, and more specifically, may be ultrasonically welded to produce a seam. The surface resistivity of the disclosed intermediate transfer member is, for example, from about $10^9$ to about $10^{13}$, or from about $10^{10}$ to about $10^{12}$ ohm/sq. The sheet resistivity of the intermediate transfer weldable member is, for example, from about $10^9$ to about $10^{13}$, or from about $10^{10}$ to about $10^{12}$ ohm/square.

The intermediate transfer members illustrated herein, like intermediate transfer belts, can be selected for a number of printing and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer or it can be comprised of several layers, such as from about 2 to about 5 layers. The circumference of the intermediate transfer member, especially as it is applicable to a film or a belt configuration, is, for example, from about 250 to about 2,500, from about 1,500 to about 2,500, or from about 2,000 to about 2,200 millimeters with a corresponding width of, for example, from about 100 to about 1,000, from about 200 to about 500, or from about 300 to about 400 millimeters.

Specific embodiments will now be described in detail. These examples are intended to be illustrative, and are not limited to the materials, conditions, or process parameters set forth in these embodiments. All parts are percentages by weight of total solids unless otherwise indicated.

Comparative Example 1

Preparation of Intermediate Transfer Member Comprised of Carbon Black:

The VULCAN® XC72R (B.E.T. surface area about 254 m$^2$/g) carbon black (CB), obtained from Cabot Corporation, was mixed with the polyamic acid solution, VTEC™ PI 1388 (PI, 20 weight percent solids in NMP, obtained from Richard Blaine International, Inc.), at varying weight ratios [CB/PI=5/95 in Comparative Example 1 (A); CB/PI=6/94 in Comparative Example 1 (B); and CB/PI=7/93 in Comparative Example 1 (C)]. By ball milling with 2 millimeter stainless shot at 160 rpm overnight, about 23 hours, uniform dispersions were obtained, and then coated on glass plates using a draw bar coating method. Each respective resulting film was dried at 100° C. for 20 minutes, and then at 204° C. for an additional 20 minutes while remaining on the glass plate. After drying and cooling to room temperature, about 23° C. to 25° C., the separate films on each of the glass plates were immersed into water overnight, about 23 hours, and the resulting individual 50 micron thick freestanding films were released from the individual glass plates.

Example I

Preparation of Intermediate Transfer Member Comprised of Nano Diamond/Polyimide:

The nano diamond NB90, obtained from NANOBLOX Inc. (ND) was mixed with the polyamic acid solution, VTEC™ PI 1388 (PI, 20 weight percent solids in NMP, obtained from Richard Blaine International, Inc.) at varying weight ratios [ND/PI=5/95 in Example I (A); and ND/PI=10/90 in Example I (B)]. By ball milling with 2 millimeter stainless shot at 160 rpm overnight, about 23 hours, uniform dispersions were obtained, and then coated on glass plates using a draw bar coating method. Each respective film was dried at 100° C. for 20 minutes, and then at 204° C. for an additional 20 minutes while remaining on the glass plate. After drying and cooling to room temperature, about 23° C. to 25° C., the separate films on each of the glass plates were immersed into water overnight, about 23 hours, and the resulting individual 50 micron thick freestanding films were released from the individual glass plates.

Example II

Preparation of Intermediate Transfer Member Comprised of Nano Diamond/Polycarbonate:

One gram of nano diamond NB90, obtained from NANOBLOX Inc. (ND), is mixed with nine grams of a bisphenol-A-polycarbonate, MAKROLON® 5705 (PC), and 100 grams of methylene chloride. By ball milling this mixture with 2 millimeters of stainless shot overnight, 23 hours, a uniform dispersion is obtained. The dispersion is then coated on a biaxially oriented poly(ethylene naphthalate) (PEN) substrate (KALEDEX™ 2000) having a thickness of 3.5 mils using known draw bar coating methods. The resulting film is dried at about 120° C. for 1 minute while remaining on the PEN substrate. After drying and cooling to room temperature, the film on the PEN substrate is automatically released from the substrate resulting in a 20 micron thick intermediate transfer member of nano diamond/polycarbonate (ND/PC) with a ratio by weight of 10/90.

Surface Resistivity Measurement

The ITB devices of Comparative Examples 1 (A), 1 (B), and 1 (C), and Examples I (A) and I (B) were measured for surface resistivity (under 500V, averaging four measurements at varying spots, 72° F./65 percent room humidity) using a High Resistivity Meter (Hiresta-Up MCP-HT450 from Mitsubishi Chemical Corp.), and the results are provided in Table 1.

TABLE 1

| ITB Devices | Surface Resistivity (ohm/square) |
|---|---|
| Comparative Example 1 (A), CB/PI = 5/95 | >$10^{14}$ |
| Comparative Example 1 (B), CB/PI = 6/94 | <$10^4$ |
| Comparative Example 1 (C), CB/PI = 7/93 | <$10^4$ |
| Example I (A), ND/PI = 5/95 | $5.46 \times 10^{12}$ |
| Example I (B), ND/PI = 10/90 | $8.65 \times 10^{10}$ |

Generally, a surface resistivity of from $10^5$ to $10^{13}$ ohm/square is a suitable ITB range for a number of situations. For the comparative ITB devices with carbon black, a small change in the CB loading percentage, such as 1 weight percent, had an adverse effect on the surface resistivity as either being too conductive or not being conductive enough primarily because the required CB loadings were positioned on the vertical part of the percolation curve, which presented a problem for achieving manufacturing robustness. As comparison, the disclosed Example I and Example II intermediate transfer belts with the core-shell nano diamond (ND) had a surface resistivity within a more suitable range of from about $10^{10}$ to about $10^{13}$ ohm/square when the ND loading varied from about 5 to about 10 weight percent.

Also, it is believed that the Examples I and II belts may exhibit less resistivity change in the welded seams as compared to polyaniline belts. Further, the nano diamond when dispersed in the cured VTEC™ PI 1388, available from Richard Blaine International, Inc., Reading, Pa., material possesses less humidity sensitivity, and lower surface friction characteristics than E.I. DuPont's KAPTON® HN films.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprised of a nano diamond comprised of a diamond core and a graphite shell thereover, and wherein said nano-diamond core is present in an amount of from about 20 to about 99.9 weight percent and said shell includes functional groups thereon.

2. An intermediate transfer member in accordance with claim 1 wherein said nano diamond has a diameter of from about 3 to about 1,000 nanometers.

3. An intermediate transfer member in accordance with claim 1 wherein said nano diamond has a diameter of from about 15 to about 200 nanometers.

4. An intermediate transfer member in accordance with claim 1 wherein said nano diamond has a diameter of from about 30 to about 100 nanometers.

5. An intermediate transfer member in accordance with claim 1 wherein said member is in the form of a flexible belt, wherein said nano diamond is present in an amount of from about 1 to about 75 percent dispersed in a polyimide, a polycarbonate, a poly(butylene terephthalate), a poly(ethylene terephthalate), a poly(ethylene naphthalate), a polyvinylidene fluoride, or a polyethylene-co-polytetrafluoroethylene.

6. An intermediate transfer member comprised of a nano diamond comprised of a diamond core and a graphite shell thereover, wherein said diamond core is present in an amount of from about 50 to about 98 weight percent, and said shell includes functional groups comprised of at least one of carbon, oxygen, nitrogen, and a metal.

7. An intermediate transfer member in accordance with claim 6 wherein said functional groups are comprised of at least one of —OH, —COOH, —NH$_2$, a quaternerized amine, —CH$_3$, Cu, Fe, Ag, Au, and Al.

8. An intermediate transfer member in accordance with claim 1 wherein said nano diamond is spherical.

9. An intermediate transfer member in accordance with claim 1 wherein said nano diamond is present in an amount of from about 1 to about 30 weight percent.

10. An intermediate transfer member in accordance with claim 1 wherein said nano diamond is present in an amount of from about 5 to about 20 weight percent.

11. An intermediate transfer member in accordance with claim 1 wherein said member is a weldable belt.

12. An intermediate transfer member in accordance with claim 1 further including a polyaniline present in an amount of from about 1 to about 30 percent by weight.

13. An intermediate transfer member in accordance with claim 1 further including a carbon black present in an amount of from about 1 to about 30 percent by weight.

14. An intermediate transfer member in accordance with claim 1 wherein said nano diamond is dispersed in a polymer of at least one of a polyimide, a polycarbonate, a poly(butylene terephthalate), a poly(ethylene terephthalate), a poly(ethylene naphthalate), a polyvinylidene fluoride, and a polyethylene-co-polytetrafluoroethylene.

15. An intermediate transfer member in accordance with claim 1 wherein said nano diamond is dispersed in a polyimide.

16. An intermediate transfer member in accordance with claim 14 wherein the ratio of said nano diamond to said polymer of at least one of a polyimide, a polycarbonate, a poly(butylene terephthalate), a poly(ethylene terephthalate), a poly(ethylene naphthalate), a polyvinylidene fluoride, and a polyethylene-co-polytetrafluoroethylene is from about 3/97 to about 20/80.

17. An intermediate transfer member in accordance with claim 1 wherein said member has a surface resistivity of from about $10^8$ to about $10^{13}$ ohm/square.

18. An intermediate transfer member in accordance with claim 17 wherein said surface resistivity is from about $10^{10}$ to about $10^{12}$ ohm/square.

19. An intermediate transfer member in accordance with claim 1 further comprising an outer release layer positioned on said member.

20. An intermediate transfer member in accordance with claim 19 wherein said release layer comprises a poly(vinyl chloride).

21. An intermediate transfer member in accordance with claim 1 wherein said intermediate transfer member has a circumference of from about 250 to about 2,500 millimeters.

22. A transfer media consisting of a nano diamond, and wherein said nano diamond consists of a diamond core and a graphite shell, wherein said nano diamond has a diameter of from about 15 to about 200 nanometers and wherein said nano diamond is dispersed in a polyimide, a polycarbonate, a poly(butylene terephthalate), a poly(ethylene terephthalate), a poly(ethylene naphthalate), a polyvinylidene fluoride, or a polyethylene-co-polytetrafluoroethylene wherein said diamond core is present in an amount of from about 20 to about 99.9 weight percent, and optionally wherein said shell includes functional groups thereon and wherein said transfer media accepts a xerographic developed image from a photoconductor followed by transferring said image to a substrate.

23. A transfer media in accordance with claim 22 wherein said nano diamond shell functional groups are at least one of the groups of —OH, —COOH, —NH$_2$, a quaternerized amine, —CH$_3$, Cu, Fe, Ag, Au, and Al.

24. A transfer media in accordance with claim 22 wherein said transfer media is in the form of a belt, and wherein said nano diamond possesses about 50 percent of sp$^3$ carbon, and 50 percent of sp$^2$ carbon.

25. A transfer media in accordance with claim 22 wherein said transfer media is in the form of a belt, and wherein said nano diamond possesses about 90 percent of sp$^3$ carbon, and about 10 percent of sp$^2$ carbon.

26. A transfer media in accordance with claim 22 wherein said transfer media is in the form of a belt, and wherein said nano diamond possesses about 98 percent of sp$^3$ carbon, and about 2 percent of sp$^2$ carbon.

27. An intermediate transfer member in accordance with claim 1 wherein said nano diamond is comprised of a plurality of nano diamonds.

* * * * *